(12) United States Patent
Xie et al.

(10) Patent No.: US 11,252,260 B2
(45) Date of Patent: Feb. 15, 2022

(54) EFFICIENT PEER-TO-PEER ARCHITECTURE FOR DISTRIBUTED MACHINE LEARNING

(71) Applicant: Petuum Inc., Pittsburgh, PA (US)

(72) Inventors: Pengtao Xie, Pittsburgh, PA (US); Qirong Ho, Pittsburgh, PA (US); Eric Xing, Pittsburgh, PA (US)

(73) Assignee: PETUUM INC, Pittsburgh, PA (US)

( * ) Notice: Subject to any disclaimer, the term of this patent is extended or adjusted under 35 U.S.C. 154(b) by 1092 days.

(21) Appl. No.: 15/849,663

(22) Filed: Dec. 20, 2017

(65) Prior Publication Data

US 2018/0302498 A1     Oct. 18, 2018

Related U.S. Application Data

(60) Provisional application No. 62/486,393, filed on Apr. 17, 2017.

(51) Int. Cl.
| | |
|---|---|
| *H04L 29/08* | (2006.01) |
| *H04L 12/24* | (2006.01) |
| *G06N 20/00* | (2019.01) |
| *G06N 5/02* | (2006.01) |
| *G06N 5/00* | (2006.01) |

(Continued)

(52) U.S. Cl.
CPC .......... *H04L 67/34* (2013.01); *G06F 12/0207* (2013.01); *G06F 17/16* (2013.01); *G06N 5/003* (2013.01); *G06N 5/022* (2013.01); *G06N 20/00* (2019.01); *H04L 41/082* (2013.01); *H04L 67/1074* (2013.01); *H04W 52/22* (2013.01); *G06F 12/0646* (2013.01); *H04L 41/0672* (2013.01); *H04L 41/145* (2013.01); *H04L 41/16* (2013.01); *H04L 67/1097* (2013.01)

(58) Field of Classification Search
CPC ........ G06N 20/00; G06N 5/003; G06N 5/022; H04L 67/34; H04L 67/1074; H04L 67/1097; H04L 41/082; H04L 41/0672; H04L 41/145; H04L 41/16
See application file for complete search history.

(56) References Cited

U.S. PATENT DOCUMENTS

| | | | | |
|---|---|---|---|---|
| 9,633,315 B2 * | 4/2017 | Chapelle | ................ | G06N 20/00 |
| 10,726,334 B1 * | 7/2020 | Elnahrawy | ............. | G06N 3/084 |

(Continued)

*Primary Examiner* — Philip C Lee

(57) ABSTRACT

A computer in a distributed peer-to-peer system is disclosed. The distributed system includes a plurality of computers configured to run a distributed machine learning (ML) program represented as an expression of a target loss function with a model parameter matrix. The computer includes: a parser module configured to convert a loss function in the distributed program into an expression graph and then one or more multiplication trees; a parameter replica module in communication with the parser module, the parameter replica module configured to maintain the model parameter matrix of the ML program; a compressor module in communication with the parameter replica module, the compressor module configured to extract sufficient factors from the expression graph for updating the model matrix; and a communication module in communication with the compressor module, the communication module configured to send the sufficient factors for updating model matrix to other machines in the distributed system.

20 Claims, 6 Drawing Sheets

(51) Int. Cl.
*H04W 52/22* (2009.01)
*G06F 12/02* (2006.01)
*G06F 17/16* (2006.01)
*G06F 12/06* (2006.01)

(56) References Cited

U.S. PATENT DOCUMENTS

| | | | |
|---|---|---|---|
| 2014/0310281 A1* | 10/2014 | Somekh | G09B 19/00 |
| | | | 707/737 |
| 2015/0193693 A1* | 7/2015 | Vasseur | H04L 63/1425 |
| | | | 706/12 |
| 2015/0324686 A1* | 11/2015 | Julian | G06N 3/08 |
| | | | 706/25 |
| 2016/0103901 A1* | 4/2016 | Kadav | G06F 16/1837 |
| | | | 707/614 |
| 2017/0091668 A1* | 3/2017 | Kadav | G06N 20/00 |
| 2018/0018590 A1* | 1/2018 | Szeto | G06F 21/6254 |
| 2018/0293493 A1* | 10/2018 | Kalamkar | G06N 3/0445 |

* cited by examiner

EFFICIENT PEER-TO-PEER ARCHITECTURE FOR DISTRIBUTED MACHINE LEARNING

FIELD OF THE INVENTION

The present invention generally relates to datacenter software systems for running distributed programs, and more particularly, is directed to a method of accelerating Machine Learning (ML) programs by implementing a peer-to-peer distributed architecture in a distributed system.

BACKGROUND

Distributed Machine Learning (ML) systems allow ML programs to be executed in a divide-and-conquer fashion across many datacenter machines, potentially allowing the ML program to complete in a fraction of the time taken by a single machine. Existing distributed Machine Learning (ML) systems largely adopt an asymmetric, client-server (CS) architecture for iterative result-aggregation due to its conceptual simplicity and linear communication cost. For instance, the CS architecture provides certain benefits, such as (1) interoperability that supports different applications; (2) high security of shared data; and (3) parsimonious communication due to the bipartite or star network topologies.

The peer-to-peer (P2P) architecture, despite its popularity in conventional distributed systems and many merits, remains under-utilized in distributed ML mainly owing to its apparent quadratic synchronization cost, which can be further exacerbated by the iterative computing algorithm and massive message size not seen in conventional systems but are prevalent in ML programs. On the plus side, the P2P architecture provides quite a few benefits, such as (1) no single failure point, which facilitates stronger fault tolerance; (2) high elasticity to resource adjustment, where adding or removing machines can be easily realized; (3) symmetric programming, which allows programmers to only program a single piece of code for all machines.

SUMMARY OF THE INVENTION

The presently disclosed embodiments are directed to solving issues relating to one or more of the problems presented in the prior art, as well as providing additional features that will become readily apparent by reference to the following detailed description when taken in conjunction with the accompanying drawings.

One embodiment is directed to a computer in a distributed peer-to-peer system including a plurality of computers configured to run a distributed machine learning (ML) program represented as an expression of a target loss function with a model parameter matrix. The computer includes: a parser module configured to convert a loss function in the distributed program into an expression graph and then one or more multiplication trees; a parameter replica module in communication with the parser module, the parameter replica module configured to maintain the model parameter matrix of the ML program; a compressor module in communication with the parameter replica module, the compressor module configured to extract sufficient factors from the expression graph for updating the model matrix; and a communication module in communication with the compressor module, the communication module configured to send the sufficient factors for updating model matrix to other machines in the distributed system.

Another embodiment is directed to a method of running a ML program on a first computer of a distributed system, the ML program represented as an expression of a target loss function with a model parameter matrix. The method includes: converting the loss function into expression graph; applying a multiplication tree transformation on the expression graph to obtain first sufficient factors; transmitting the first sufficient factors to a second computer of the distributed system; receiving second sufficient factors from the second computer; substituting the second sufficient factors into the expression graph; and re-computing the expression graph to update the model parameter matrix.

Further features and advantages of the present disclosure, as well as the structure and operation of various embodiments of the present disclosure, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

Figure 1:
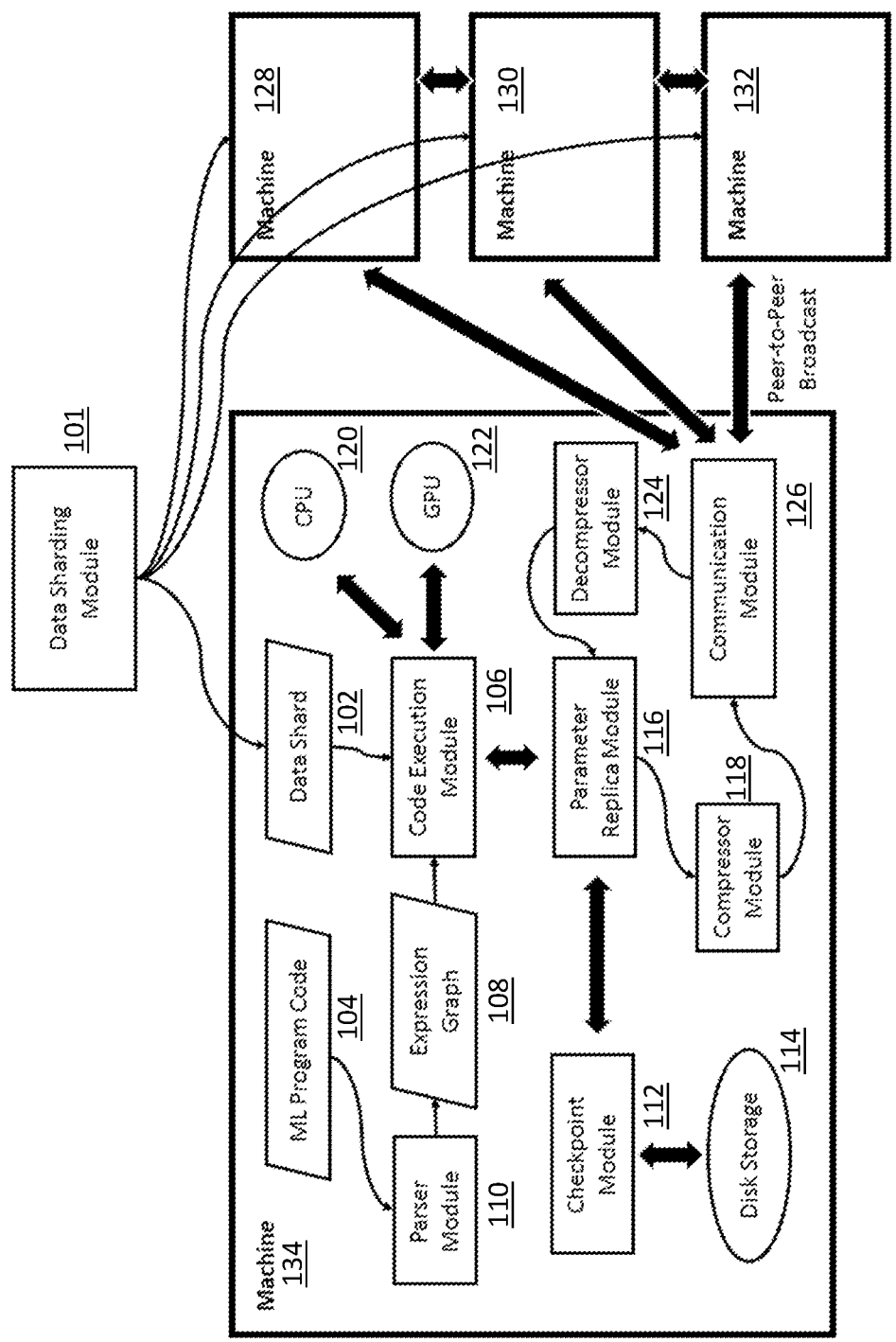
FIG. 1 is a block diagram illustrating an exemplary Peer-to-Peer (P2P) system for executing a distributed Machine Learning (ML) program in a data center in a divide-and-conquer fashion according to embodiments of the invention.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Disclosed here is a distributed peer-to-peer (P2P) system 100 (FIG. 1) that can efficiently execute one or more distributed Machine Learning (ML) programs across multiple datacenter machines 128, 130, 132, 134 in a divide-and-conquer fashion. This cluster of datacenter machines 128, 130, 132, 134 can collectively be referred to as a distributed system. Each datacenter machine (or "machine") 128, 130, 132, 134 can be a standalone computer or a virtual machine running on one or more computers. Each machine 128, 130, 132, 134 can communicate with one or more other machines in the distributed system. In the example illustrated in FIG. 1, each machine 128, 130, 132, 134 can communicate with all other machines, forming the P2P network system 100. This P2P system 100 is designed to outperform client-server (CS) systems such as parameter servers when a number of clients each communicate with a shard server. The P2P system reduces the network communication costs of running ML programs by compressing the messages that each machine needs to send to all other machines in the course of the ML program's operation. Network communication costs can account for 90% or more of the running time of an ML program. As detailed below, the disclosed P2P system can largely eliminate these costs to produce order-of-magnitude improvements in ML program completion time, without loss of solution quality.

In one embodiment, as shown in FIG. 1, the P2P system 100 can include multiple datacenter machines 128, 130, 132, 134. It should be understood that although four machines are shown in the system 100 of FIG. 1, the system can include any number of machines. The P2P system 100 can also include a Data Sharding module 101 connected to each of the machines 128, 130, 132, 134. The Data Sharding module 101 may reside on a computer or multiple computers (not shown) separate from the datacenter machines 128, 130, 132, 134. The Data Sharding module 101 can receive a data file, create data segments (or "shards") and distributed the shards to the machines 128, 130, 132, 134 in the distributed P2P system 100. As an example, assuming there are P number of machines, the data can be partitioned into P equally-sized subsets (shards), and distributed to each machine. In this embodiment, each machine (e.g., 134) can receive one data shard and can store the received data shard (e.g., 190) locally, as illustrated in FIG. 1.

Each machine (e.g., machine 134) in this distributed P2P system 100 may include the following exemplary modules: Parser module 110, Code Execution module 106, Compressor module 118, Communication module 126, Decompressor module 124, Parameter Replica module 116, and Checkpoint module 112. Each machine may also include one or more storages 114 and one or more processors such as CPU 120 and GPU 122. Also, not illustrated in FIG. 1, each of machines 128, 130, and 132 can include the same modules as machine 134. The machines can communicate to each other via peer-to-peer broadcast through their respective communication modules 126. The communication modules 126 networking interfaces of these machines are arranged according to a symmetric, fully-connected topology, where each machine may directly message all other machines. This is distinct from the asymmetric client-server (CS) architecture, where client machines may only message server machines, and servers may only message clients.

As illustrated in FIG. 1, each machine 128, 130, 132, 134 can also include a copy of the ML program code 104. The ML program can be specified as an expression of a target loss function, with a model parameter matrix denoted by W. When the ML program is run, the Parser module 110 can parse the ML program code into intermediate objects needed for automatic discovery of Sufficient Factors, which are the basic compressible unit of information in the ML program. A Sufficient Factor can be a pair of mathematical vectors (u, v), where u is of length N, and v is of length M, that can be used to fully reconstruct the matrix W of dimensions N by M.

A loss function f(W) can be a mathematical function that takes as input a model parameter matrix W, and provides an output of a number measuring how close the ML program is to completion. Then, the mathematical gradient of the loss function with respect to the parameters W is automatically derived using an automatic differentiation system. The gradient is also represented as an expression graph of operators, alongside the loss function expression graph. For compatible ML programs, the gradient expression graph can contain subtrees corresponding to outer product multiplication operations (which multiply two input vectors to produce an output matrix). For example, the Parser module 110 can parse the loss function shown below into an expression graph 108.

$$f=\|\log(W^*x+c)-y\|_2$$

Figure 2:
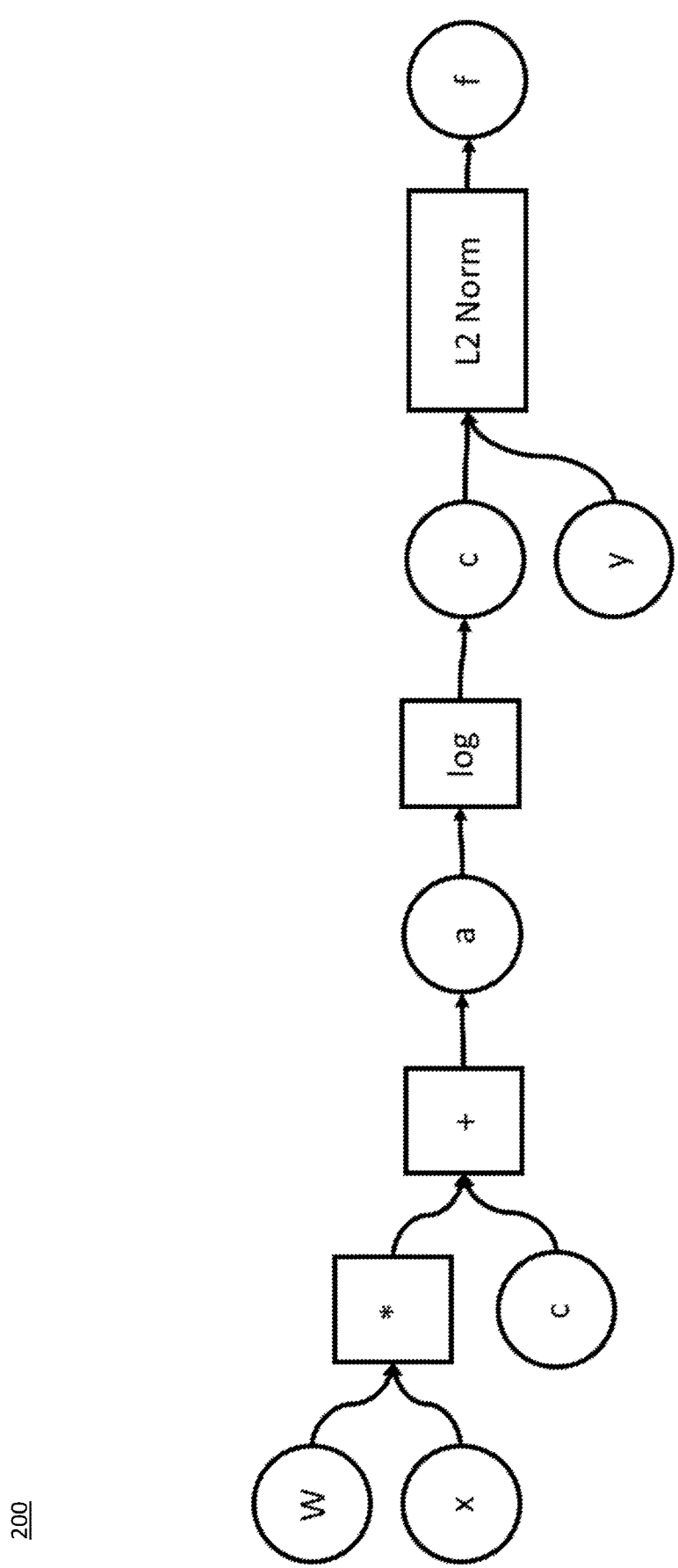
FIG. 2 illustrates an exemplary expression graph that represents a loss function of the ML program in terms of operators and intermediate variables according to embodiments of the invention.

An exemplary expression graph 200 generated from the function above is shown in FIG. 2.

Figure 3:
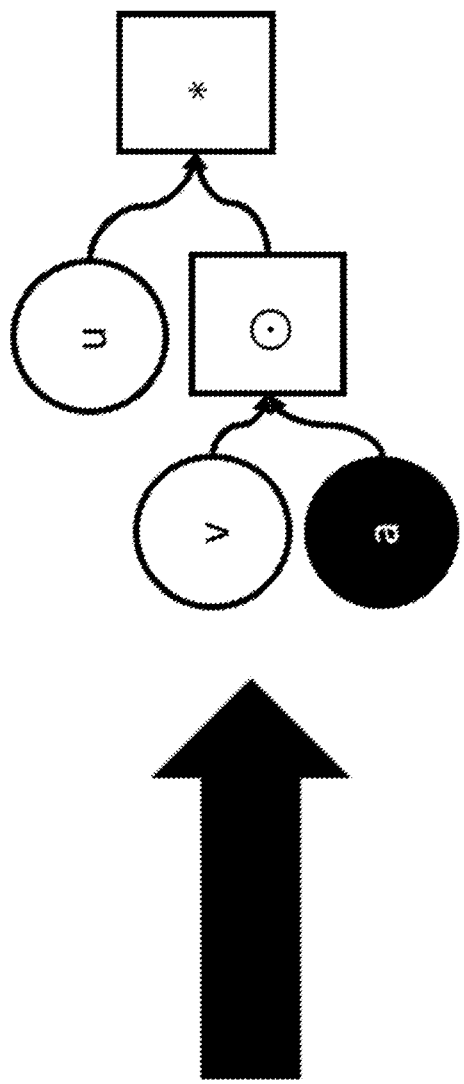
FIG. 3 illustrates an exemplary multiplication tree transformation process to further optimize the expression of FIG. 2 according to embodiments of the invention.
Figure 3:
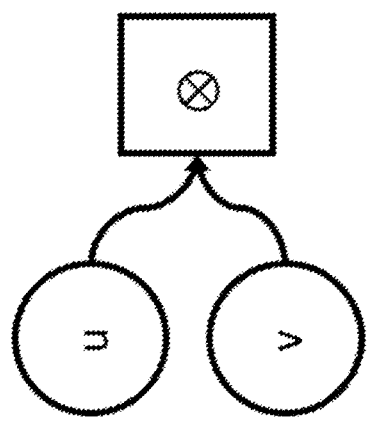

The expression graph can be further optimized by applying a multiplication tree transformation. The Parse module 110 can scan the original expression tree, and mark any subtree containing an outer product multiplication operation. The Parse module 110 then transforms the marked subtrees into new subtrees that contain a scalar-vector multiplication operation (which produces a scalar) as well as an inner product multiplication operation (which multiplies two vectors to produce a scalar). An example of this transformation is illustrated in FIG. 3 where update to the model parameter matrix W is decomposed into mathematical factors (e.g., Sufficient Factors) u and v and a new subtree is generated from an existing subtree.

The multiplication tree transformation can expose the Sufficient Factors (u, v) in the ML program, which are defined to be the two vectors inputs to the original outer product multiplication operation, now transformed into a multiplication tree. Network compression is achieved by discovering these Sufficient Factors (u, v) through the Parse module 110, and then sending the much smaller Sufficient Factors (u, v) across the network in order to reconstruct the full matrix-shaped gradient at the destination machine, rather than sending the large full gradient itself. The result of the multiplication tree transformation can be fed to the Code Execution module 106.

The Code Execution module 106 can compute the loss function and gradient expression graphs by performing an in-order traversal of the graph and invoking pre-built operator implementations—such as matrix multiplication and vector addition—to compute the result at each graph node. The Code Execution module 106 can contain a wide library of these pre-build operator implementations in order to support a broad spectrum of ML programs. When the Code Execution module 106 runs on a machine, it has access to the local data shard 102 on that machine.

The Code Execution module 106 can support heterogeneous computing environments with a mix of one or more CPUs 120 and one or more Graphics Processing Units (GPUs) 122. To provide optimal performance on both CPUs 120 and GPUs 122, each operator carries both a CPU and a GPU implementation, and the Code Execution module 106 can choose the appropriate implementation depending on the available CPUs 120 and GPUs 122 in the machine.

In GPU operator implementations, the Code Executor module 106 needs to contend with the large overhead of launching GPU code (kernels). The Code Execution module 106 can overcome this by fusing less time-consuming kernels into a single larger kernel, thus reducing the number of kernel launches. This is accomplished by traversing the expression graphs and fusing consecutive operations that meet certain compatibility criteria, such as element-wise operation. These operations are replaced with a single GPU kernel.

During program execution, the Code Execution module 106 on each machine exchange model parameter can update at regular intervals. Each time the expression graph is updated due to the presence of a new data shard, the Code Execution module 106 needs to communicate these changes to the Parameter Replica Module 116. The model parameters W can be replicated P times, and each machine can hold one copy. When the Code Execution module 106 runs on a machine, it computes ML program parameter updates using the local data shard 102 and the local copy of the parameters W. The Parameter Replica module 116 can maintain the state and model parameters of the ML program. Essentially, the Parameter Replica module 116 can serve as an interface for the exchange of the expression graph updates among the machines 128, 130, 132, 134 of the distributed system 100.

The Compression module 108 can operate in one or more operation modes. In the BASIC operation mode, the Compression module 108 can extract the Sufficient Factors from the Parse module's multiplication trees, and send them to the Communication module 126, which then broadcasts the Sufficient Factors to all other machines 128, 130, 132. At the destination machines 128, 130, 132, the Communication modules (not explicitly shown in machines 128, 130, 132) can receive the Sufficient Factors, and send them to their respective Decompression module (also not shown in FIG. 1). The Decompression module on each receiving machine can reconstruct the gradient update to the parameters W by substituting the Sufficient Factors (e.g., u, v) into their local multiplication trees and invoking the Code Execution module 106 to compute the gradient. An exemplary process is illustrated in FIG. 4.

Figure 4:
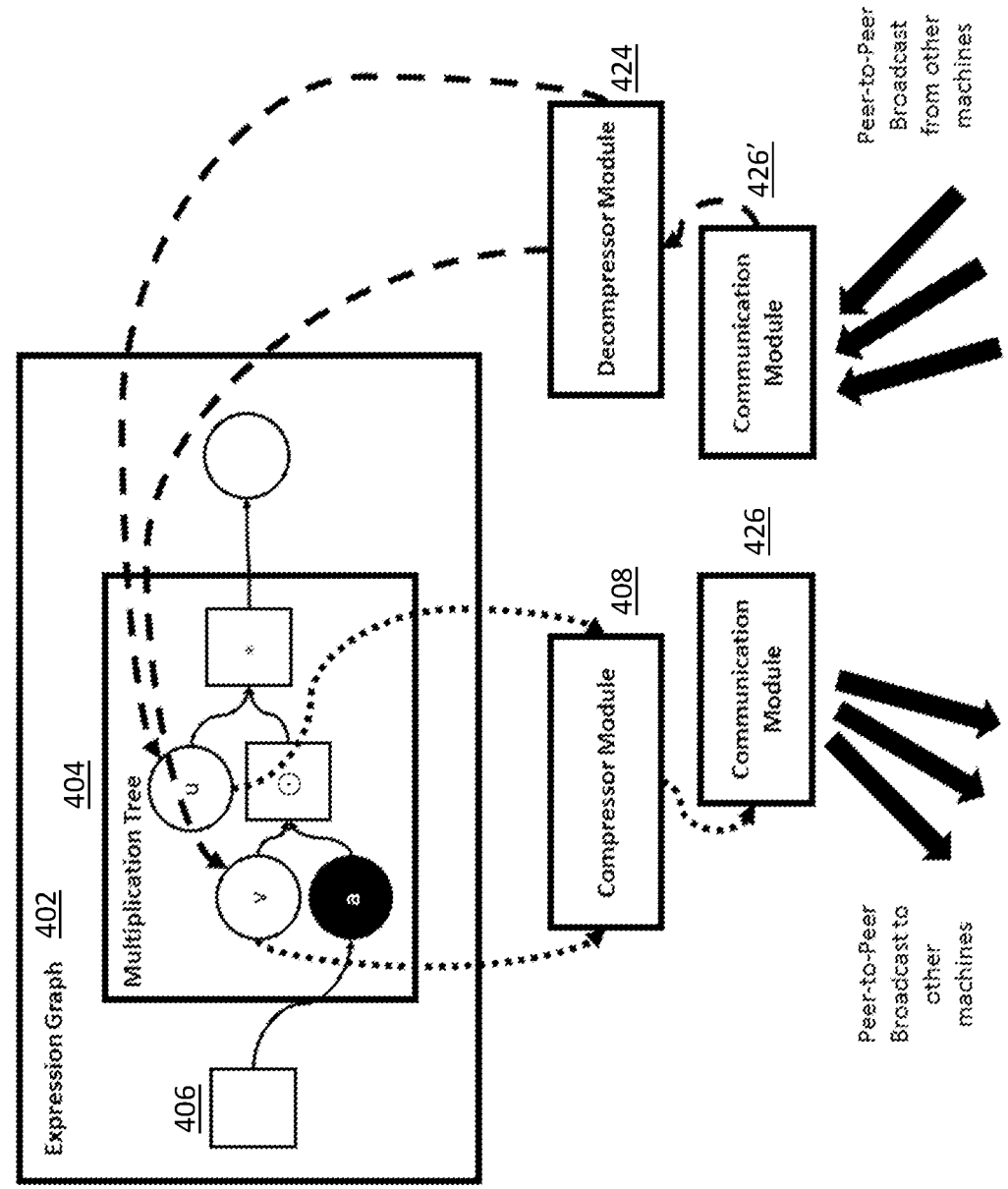
FIG. 4 illustrates an exemplary Sufficient Factor compression and decompression processes according to embodiments of the invention.

As illustrated in FIG. 4, the expression graph 402 can be further optimized by applying a multiplication tree transformation 404. Specifically, an update 406 to the model parameter matrix W is decomposed into mathematical factors (e.g., Sufficient Factors) u and v. The compressor module 408 can then extract sufficient factors (u, v) and the communication module 426 can then send sufficient factors (u, v) for updating model matrix W to other machines on the distributed system via peer-to-peer broadcasting. The same or a different communication module 426' can also receive sufficient factors for updating model matrix W from other machines. The decompression module 424 can then substitute the other machines' sufficient factors in the expression graph 402. The expression graph can be re-computed to produce updates to the model matrix W.

The Sufficient Factor compression by the Compression Module 108 and Decompression Module 124 can be extremely effective for larger ML programs. Supposing the parameter W is a matrix with N rows and M columns (and thus requires N*M elements of storage), the total size of its Sufficient Factors (u, v) would only be N elements and M elements respectively. For large W matrices with over 100,000 rows and columns, Sufficient Factor compression can reduce network bandwidth usage by several orders of magnitude.

Apart from the BASIC operation mode, the P2P system has additional operational modes: Subselection (SUBSEL) broadcast, Random Partial broadcast (RPB), and Bounded Asynchronous Parallel (BAP) broadcast. These modes can be activated individually or used together to further boost the compression efficiency of the P2P system. The combination of SUBSEL, RPB, and BAP achieves the maximum possible network compression.

SUBSEL mode causes the Communication module 126 to filter out Sufficient Factors, and only transmit the most informative ones over the network. This is made possible because many Sufficient Factors are empirically observed to be redundant, and contribute minimally to the ML program. The filtering algorithm picks a set of C Sufficient Factors to transmit out of a pool of D Sufficient Factors. The C Sufficient Factors are chosen using an optimization algorithm, which ensures they form a good mathematical basis for the whole pool of D Sufficient Factors.

RPB mode causes the Communication module 126 to broadcast Sufficient Factors to a randomly chosen subset of Q datacenter machines, instead of broadcasting to all P machines. Thus, the information from the Sufficient Factors is not immediately received by all machines, but is eventually propagated after several rounds of communication. Empirically, this does not compromise algorithm accuracy, yet can greatly reduce network bandwidth costs when Q is much smaller than P. RPB mode can be extremely effective on datacenters with hundreds or thousands of machines, for example, when Q=log(P).

BAP mode causes the Communication module 126 to switch to BAP communications mode, where each machine does not wait for all incoming Sufficient Factors to be received, but instead proceeds ahead with the next round of ML program computation and Sufficient Factor broadcast. No machine may be more than S rounds ahead of the slowest machine; this ensures ML programs execute correctly. BAP mode reduces the sensitivity of the P2P system to inconsistent machine performance, which may occur due to other running programs on the datacenter or environmental factors, such as vibration and heat that affect hardware performance. In highly unpredictable datacenter environments with many users, BAP mode can be 5 to 10 times faster than non-BAP mode.

Referring back to FIG. 1, the Checkpoint module 112 is in communication with the Parameter Replica module 116 and can save the parameters and internal state of the ML program to disk storage 114 at regular intervals, which can be restored in the event of machine or system failure. Because the parameter matrix W is composed of many small Sufficient Factors, the Checkpoint module 112 will save the Sufficient Factors rather than the matrix W, which reduces storage costs dramatically. The disk storage 114 can be any type of well-known computer storage such as a hard-drive or a random-access memory (RAM).

Figure 5:
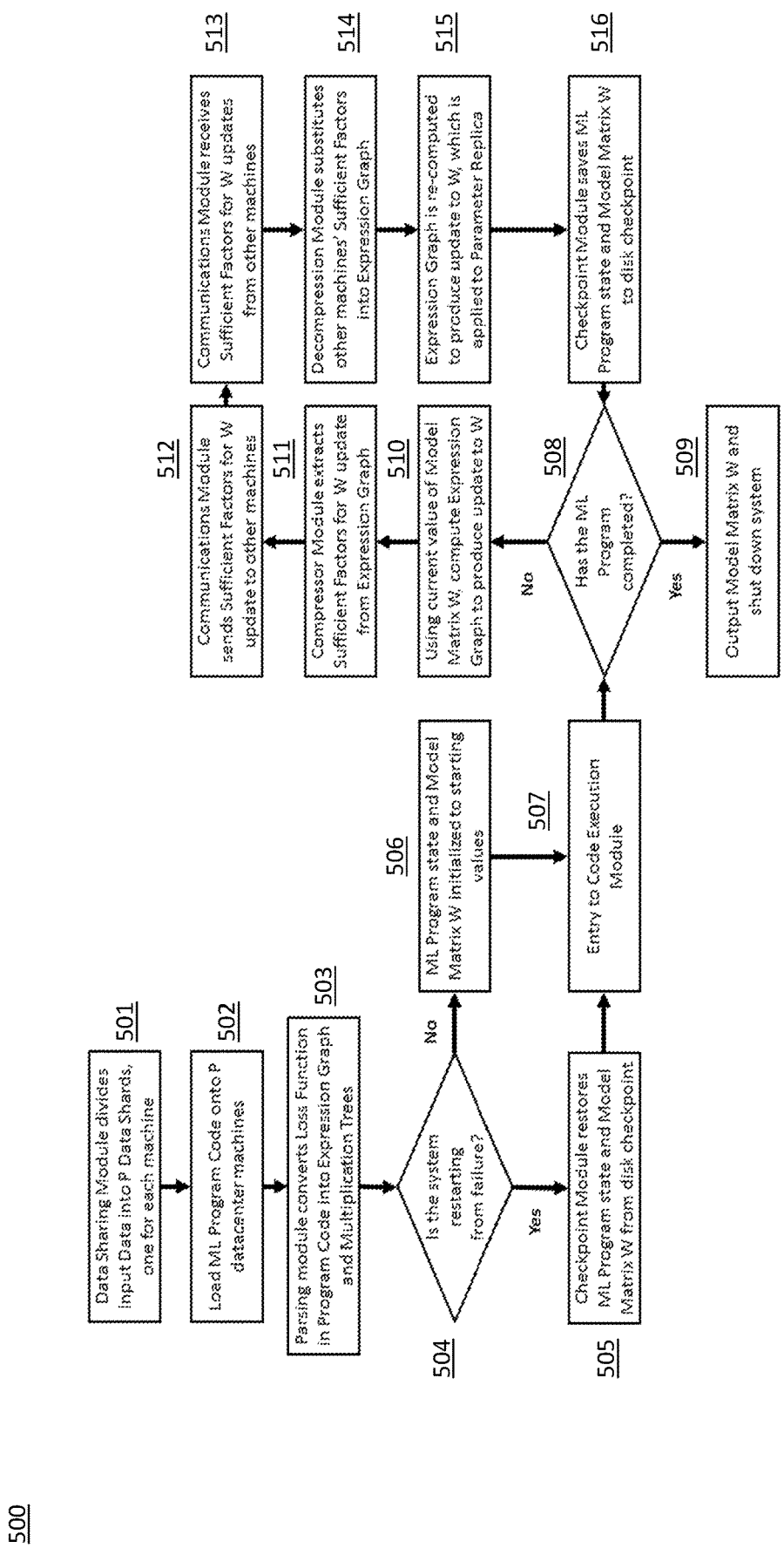
FIG. 5 is a flow chart showing an exemplary process of executing distributed ML programs in a data center using the P2P system of FIG. 1 according to embodiments of the invention.

FIG. 5 is a flow chart diagram showing an exemplary process of executing distributed ML programs in a data center using the P2P system 100 of FIG. 1 according to embodiments of the invention. First, the Data Sharding module 101 can divide the input data into P (e.g., 4) data shards, one for each machine 128, 130, 132, 134 (step 501). Then, the ML program code can be loaded onto the P (e.g., 4) datacenter machines 128, 130, 132, 134 (step 502) The Parsing module 110 can convert the loss function in the program code into, for example, an expression graph and then multiplication trees (step 503). It can then be determined if the system is restarting from a failure (step 504). If yes, the Checkpoint module 112 can restore the ML program state and model matrix W from a disk checkpoint maintained in a disk storage 114 (step 505) and provide an entry to the code execution module (step 507). If the system is not restarting from a failure, the ML program state and Model Matrix W can be initialized to their starting values (step 506) and entry to the code execution module can be provided (step 507).

A determination can be made as to whether the ML program has completed (step 508). If yes, the model matrix W can be output and the system can be shut down (step 509). If it is determined that the ML program has not completed, the current value of model matrix W can be used for computing an expression graph to produce an update to the model matrix W (step 510). The Compressor Module 118 can then extract sufficient factors from the expression graph for updating model matrix W (step 511). The Communication module 126 can then send sufficient factors for updating model matrix W to other machines on the distributed system (step 512). The Communication module 126 can also receive sufficient factors for updating model matrix W from other machines (step 513). The decompression module 124 can substitute the other machines' sufficient factors in the expression graph (step 514). The expression graph can be re-computed to produce updates to the model matrix W (step 515). The updates can be applied to the Parameter Replica module 116. The Checkpoint module 112 can save the latest ML program state and model matrix W to a disk checkpoint (step 516). Thereafter, the process can repeat from step 508 until the ML program is completed and model matrix W is output and the system shuts down (step 509). The same exemplary steps discussed above can be performed simultaneously on one or more of the machines 128, 130, 132, 134 in the distributed P2P system 100 when the ML program is in operation.

Figure 6:
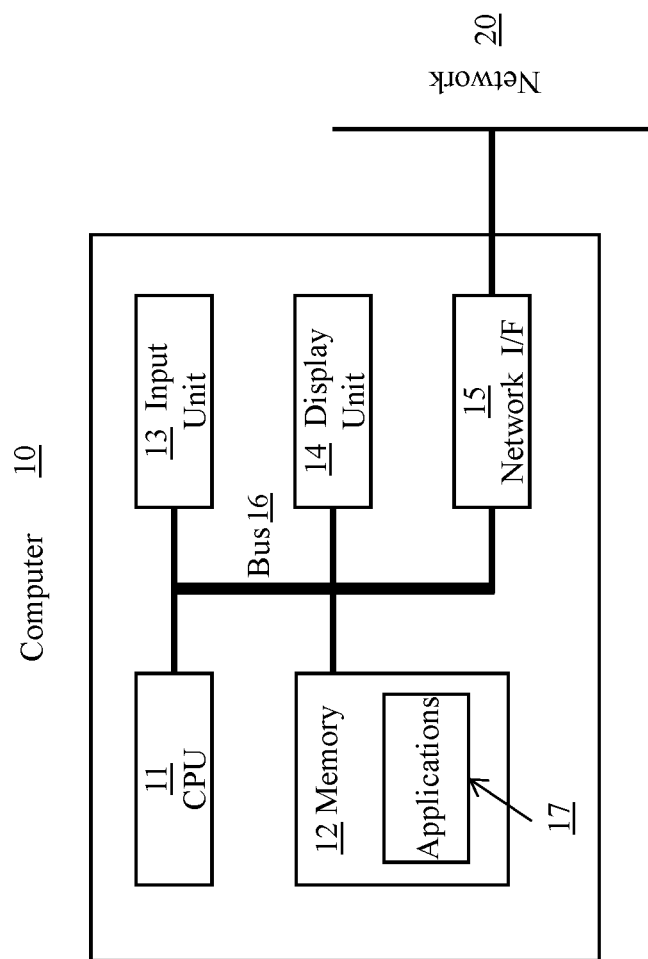
FIG. 6 is a block diagram illustrating an exemplary computer in which embodiments of the invention can be implemented.

FIG. 6 illustrates the exemplary components of a computer (or machine) 10 which can be any of the computers 128, 130, 132, 134 in the distributed P2P system 100 of FIG. 1. The computer 10 can include a central processing unit (CPU) 11, memory 12 storing one or more applications 17, an input unit 13, a display unit 14, and a network interface 15, all connected to a bus 16. The network interface 15 allows the computer to connect to a network 20. In a computer such as the ones shown in FIG. 1, the one or more illustrated modules can be stored in memory 12. Memory 12 can include both a GPU memory and a CPU memory. The input unit 13 can receive use input or data. The network interface 15 allows computer to communicate with one or more of the other computers on the network.

While various embodiments of the invention have been described above, it should be understood that they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described. They instead can be applied alone or in some combination, to one or more of the other embodiments of the disclosure, whether or not such embodiments are described, and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A computer in a distributed peer-to-peer system including a plurality of computers configured to run a distributed machine learning (ML) program represented as an expression of a target loss function with a model parameter matrix, the computer comprising:
   a parser module configured to convert a loss function in the distributed program into an expression graph and then one or more multiplication trees;
   a parameter replica module in communication with the parser module, the parameter replica module configured to maintain the model parameter matrix of the ML program;
   a compressor module in communication with the parameter replica module, the compressor module configured to extract sufficient factors from the expression graph for updating the model parameter matrix; and
   a communication module in communication with the compressor module, the communication module configured to send the sufficient factors for updating model matrix to other machines in the distributed system.

2. The computer of claim 1, further comprising a decompressor module configured to reconstruct a gradient update to the model parameter matrix.

3. The computer of claim 2, wherein reconstructing a gradient update to the model parameter matrix comprising substituting sufficient factors into local multiplication trees.

4. The computer of claim 1, wherein the communication module is further configured to receive sufficient factors from one or more other computers in the distributed system.

5. The computer of claim 1, further comprising a checkpoint module configured to store the model parameter matrix and state of the ML program to a disk storage.

6. The computer of claim 1, further comprising a code execution module configured to compute the target loss function and gradient expression graphs.

7. The computer of claim 1, wherein the code execution module is further configured to a heterogeneous computing environment with a mix of at least one central processing unit (CPU) and one Graphics Processing Units (GPU).

8. The computer of claim 1, wherein the communication module is configured to send the sufficient factors for updating model matrix to each of the other computers in the distributed system when the system is operating in a first mode.

9. The computer of claim 1, wherein the communication module is configured to filter out the sufficient factors and only transmit selective ones to the other computers in the system when the system is operating in a second mode.

10. The computer of claim 1, wherein the communication module is configured to broadcast the sufficient factors to a randomly chosen subset of the other computers when the system is operating in a third mode.

11. The computer of claim 1, wherein the communication module is configured to broadcast the sufficient factors before all incoming sufficient factors are received when the system is operating in a fourth mode.

12. A method of running a ML program on a first computer of a distributed system, the ML program represented as an expression of a target loss function with a model parameter matrix, the method comprising:
   converting the loss function into expression graph:
   applying a multiplication tree transformation on the expression graph to obtain first sufficient factors;
   transmitting the first sufficient factors to a second computer of the distributed system;
   receiving second sufficient factors from the second computer;
   substituting the second sufficient factors into the expression graph; and
   re-computing the expression graph to update the model parameter matrix.

13. The method of claim 12, further comprising storing the model parameter matrix in a storage.

14. The method of claim 12, further comprising determining the first computer is restarting due to a failure.

15. The method of claim 14, further comprising: if it is determined that the first computer is restarting due to a failure, restoring a status of the ML program and the model parameter matrix.

16. The method of claim 12, further comprising applying the updated model parameter matrix to parameter replica.

17. The method of claim 12, further comprising saving the updated model parameter matrix to disk checkpoint.

18. A distributed P2P system comprising a plurality of computers, each computer comprising:
   a parser module configured to convert a loss function in a distributed program into an expression graph and then one or more multiplication trees;

a parameter replica module in communication with the parser module, the parameter replica module configured to maintain model parameter matrix of a ML program;

a compressor module in communication with the parameter replica module, the compressor module configured to extract sufficient factors from the expression graph for updating the model parameter matrix;

a decompressor module configured to reconstruct a gradient update to the model parameter matrix; and a communication module in communication with the compressor module, the communication module configured to send the sufficient factors for updating model matrix to other machines in a distributed system.

19. The distributed P2P system of claim 18, wherein each computer further comprises a checkpoint module configured to store the model parameter matrix and state of the ML program to a disk storage.

20. The distributed P2P system of claim 18, wherein each computer further comprises a code execution module configured to compute the target loss function and gradient expression graphs.

* * * * *